(12) United States Patent
Mühlemann

(10) Patent No.: US 6,774,883 B1
(45) Date of Patent: Aug. 10, 2004

(54) ELECTRO-OPTICAL DISPLAY DEVICE WITH TEMPERATURE DETECTION AND VOLTAGE CORRECTION

(75) Inventor: Kurt Mühlemann, Vetikon (CH)

(73) Assignee: Koninklijke Philips Electronics N.V., Eindhoven (NL)

( * ) Notice: Subject to any disclaimer, the term of this patent is extended or adjusted under 35 U.S.C. 154(b) by 894 days.

(21) Appl. No.: 09/035,431

(22) Filed: Mar. 5, 1998

(30) Foreign Application Priority Data

Mar. 11, 1997 (EP) .............................................. 97200716

(51) Int. Cl.⁷ ................................................ G09G 3/36
(52) U.S. Cl. ...................................... 345/101; 345/205
(58) Field of Search ........................ 345/101, 205–206, 345/87, 89, 55, 204, 100; 374/178; 349/72, 199; 257/467

(56) References Cited

U.S. PATENT DOCUMENTS

| | | | |
|---|---|---|---|
| 5,029,982 A | * | 7/1991 | Nash ............................ 349/72 |
| 5,414,441 A | * | 5/1995 | Memarzadeh et al. ......... 345/87 |
| 5,608,422 A | * | 3/1997 | Ikeda .......................... 345/101 |
| 5,694,147 A | * | 12/1997 | Gaalema et al. ............. 345/101 |
| 5,748,170 A | * | 5/1998 | Goto ........................... 345/101 |
| 5,754,171 A | * | 5/1998 | Stoller ......................... 345/205 |
| 5,831,588 A | * | 11/1998 | Hotto .......................... 345/100 |
| 5,852,430 A | * | 12/1998 | Endo ........................... 345/101 |
| 5,936,603 A | * | 8/1999 | Lippmann et al. ........... 345/101 |
| 5,961,215 A | * | 10/1999 | Lee et al. ..................... 374/178 |
| 6,067,062 A | * | 5/2000 | Takasu et al. ................ 345/87 |

FOREIGN PATENT DOCUMENTS

EP 0642113 A1 3/1995

* cited by examiner

Primary Examiner—Richard Hjerpe
Assistant Examiner—Frances Nguyen
(74) Attorney, Agent, or Firm—Kevin Simons

(57) ABSTRACT

A display device (1) provided with a digital thermometer on-chip (12), sensing the temperature of the supporting plate (3) of an electro-optical medium (4), for example, a liquid crystal display medium, while in a special embodiment, this digital temperature sensor and a column and/or row driver (5) are provided by means of thin film technology. In a preferred embodiment the temperature sensor and the column or row driver are integrated on one chip.

8 Claims, 2 Drawing Sheets

ELECTRO-OPTICAL DISPLAY DEVICE WITH TEMPERATURE DETECTION AND VOLTAGE CORRECTION

BACKGROUND OF THE INVENTION

The invention relates to an electro-optical display device comprising an electro-optical display medium between two supporting plates, means for indicating the temperature of the electro-optical medium, and means, responsive to said indication, for generating a corrected voltage dependent on said indication to compensate for changes in said temperature.

Display devices of the kind mentioned are used in, for example, portable computers, telephones, car displays, etc.

An electro-optical display device of the kind mentioned above is described in EP-A-0.642.113 (PHN 14.599). To compensate for the variation of the transmissionvoltage characteristic curve due to temperature changes in a ferroelectric display device, the display device is provided with one or more measuring elements for measuring the polarization current. The drive voltages are corrected by measuring the polarization current and comparing this to the polarization current at 50% transmission level to obtain an indication for the temperature.

Due to the fact that measured values are compared in a separate comparator inaccuracies occur e.g. because of errors in signal propagation, cross-talk and inaccuracy in the comparator.

OBJECTS AND SUMMARY OF THE INVENTION

One of the aims of the invention is to provide an electro-optical display device in which temperature sensing and further processing are simplified.

Another aim is to prevent errors due to signal propagation as much as possible.

An electro-optical display device according to the invention is characterized in that said means for indicating the temperature of the electro-optical display medium comprise a temperature sensor which provides a digitized temperature value and is arranged on one of the supporting plates.

By providing the temperature as a digitized value, it can immediately be processed, for example, in a separate microcontroller or in a microcontroller in the same integrated circuit in which the temperature sensor is realized to generate the necessary correction. Since the temperature values are digitized, errors in signal propagation due to cross-talk hardly occur. A temperature sensor providing a digitized temperature value is described in "Micropower CMOS Temperature Sensor with Digital Output" by A. Bakker and J. H. Huijsing, IEEE, Journ. of Solid-State Circuits, Vol. 31, No 7, pages 933–937.

In known displays, thermistors are used as means for obtaining indications on the temperature, or diodes, in which the temperature dependency of the forward voltages on temperature are used. In these cases, analog values of (reference) voltages are obtained separately which are used for further processing to compensate for temperature changes. Separate AD-converters, are used in said compensation methods. The analogue value is converted at places different from the temperature sensing point, leading to errors in conversion due to voltage loss (in transmission), and temperature difference between the measuring spot and the place where actual conversion occurs.

To obtain an optimal thermal coupling between the electro-optical material and the temperature sensor, the temperature sensor is realized in an integrated circuit, the integrated circuit being face-down bonded to said one of the supporting plates.

The output of the temperature sensor (comprising, for example, a microprocessor and a programmable memory or a look-up table) controls (a) voltage driver(s) (a column driver or row driver or a combination). In a preferred embodiment at least the temperature sensor and the voltage driver(s) are realized on said one supporting plate by means of an integrated circuit. In a further preferred embodiment the temperature sensor and the voltage driver(s) are realized on said one supporting plate by means of thin film (transistor) technology.

BRIEF DESCRIPTION OF THE DRAWING

These and other aspects of the invention will now be elucidated with reference to the embodiments described hereinafter. In the drawing.

The Figures are diagrammatic and not to scale. Similar elements generally have the same reference numerals.

DESCRIPTION OF THE PREFERRED EMODIMENTS

Figure 1:
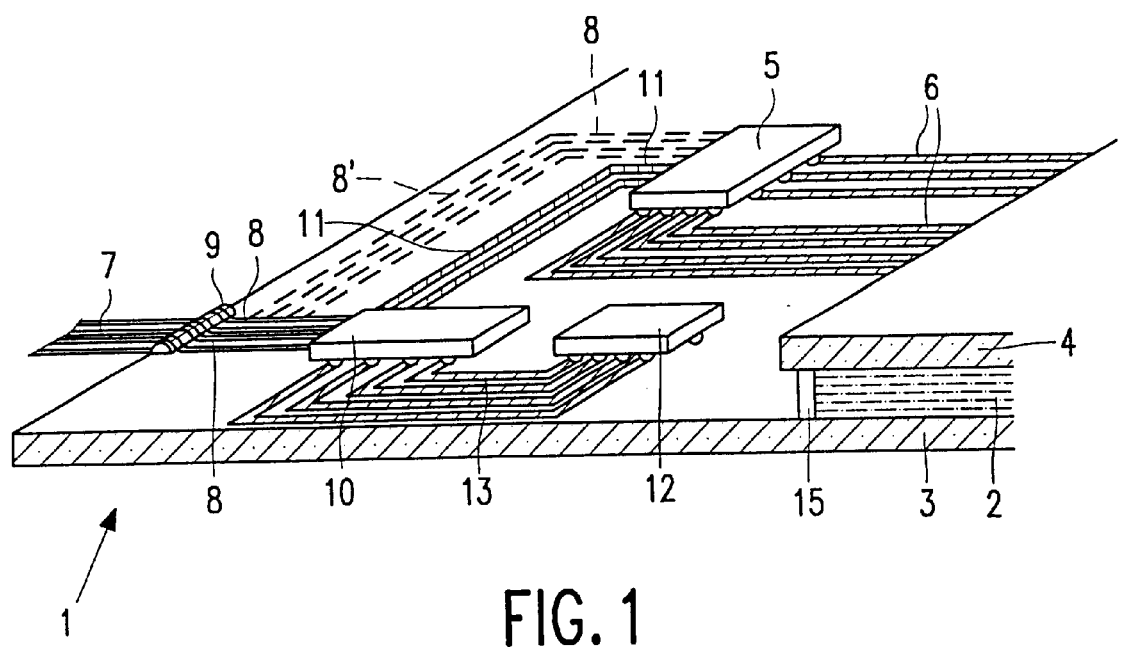
FIG. 1 shows a first embodiment of a device according to the invention.

FIG. 1 shows a display device 1 with supporting plates 3,4 enclosing an electro-optical medium 2, in this example a liquid crystalline material. The supporting plate 3 is provided with a column driver 5 for presenting drive voltages, in this case data voltages, to column electrodes 6. For the sake of clarity, only a few column electrodes are shown in FIG. 1. In a similar way, the supporting plate 4 is provided with a row driver (not shown) for presenting selection voltages to row electrodes (not shown). The device has a sealing rim 15 between the supporting plates 3,4, sealing the space in which the liquid crystal is present.

An external connection 7 for incoming data supplies, for example, digitally coded data to data lines 8 on the supporting plate 3, in this case via a connector 9. In the embodiment of FIG. 1, the incoming data is used as input data for a microprocessor 10 (alternatively, a look-up table may be used) which provides the column driver 5 with (coded) data via interconnecting tracks 11 on the supporting plate 3. Said coding is programmed in a (programmable) read-only memory (P)ROM, which may be erasable, of the microprocessor (or in the look-up table (LUT).

According to the invention, an integrated circuit (IC) 12 comprising a temperature sensor, which provides a digitally coded temperature, is arranged on the same supporting plate 3. Such a temperature sensor providing a digitized temperature value is described in "Micropower CMOS Temperature Sensor with Digital Output" by A. Bakker and J. H. Huijsing, IEEE, Journ. of Solid-State Circuits, Vol. 31, No 7, pages 933–937. For optimum temperature sensing, the integrated circuit is face-down bonded to the supporting plate 3, preferably as close to the liquid crystal material as possible. Via interconnecting tracks 13, the digitized temperature value is also used as input data for the microprocessor 10 to correct incoming data dependent on the temperature measured. The digitized temperature value is hardly effected by external cross-talk. The data supplied to the column driver 5 via interconnecting tracks 11 is now corrected for temperature variations.

Due to the programmability of the (E)PROM (LUT), the device can easily be adapted to the temperature dependency of different electro-optical materials.

Voltage levels to be supplied to column (or row) electrodes are often directly related to the supply voltage of the column (row) drivers. In this case, instead of correcting the drive (column) voltages to be supplied to column electrodes 6, the supply voltage of the column driver 5 is corrected via the interconnecting tracks 11, while the column driver 5 is provided with incoming data (shown by broken lines 8' in FIG. 1).

A similar correction is applied, if necessary, to selection voltages which are supplied to row drivers on the supporting plate 4. The digitized temperature value, the corrected digitally coded selection values or the corrected row voltages are now supplied to either a second microprocessor, a row driver (digitally coded selection values) or to row electrodes (corrected row voltages) on the supporting plate 4 via anisotropic conductors in the rim 15.

In a further embodiment, all functions of the microprocessor (LUT) 10 are performed by a processor, which is part of a larger (controlling) system. The digitized temperature value is now used (via external connections 7, to which interconnection tracks 13 are interconnected in this case) as an input for the controlling system which via lines 7, 8 controls the column drivers 5 or row drivers. Controlling occurs via the supply voltage or by adapting the drive voltages in the drivers. The programming of the controller can easily be adapted for different temperature characteristics of different electro-optical media.

In a modification of this embodiment no ICs are used for the temperature sensor 12 and the column driver 5 but they are realized by thin film technology (e.g. CMOS-TFT-technology) on the supporting plate 3. In this relation the reference numerals 12 and 5 have to be understood as functional equivalents of the temperature sensor and the (column) driver, realized by circuit elements like transistors, directly on the supporting plate 3.

Figure 3:
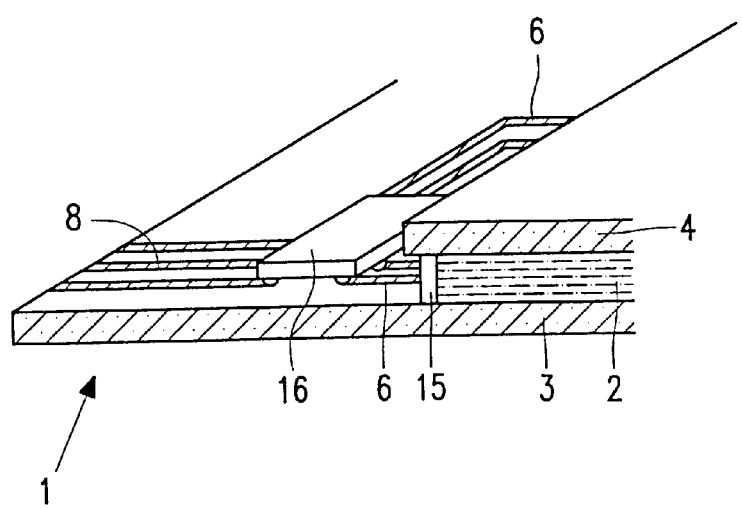
FIG. 3 shows a third embodiment of a device according to the invention.

FIG. 3 shows a further embodiment of the invention. All functions of the temperature sensor 12, the microprocessor (LUT) 10 and the column driver 5 have now been integrated on a single chip 16 which is face-down bonded to the supporting plate 3. By face-down bonding the chip 16, the temperature of the supporting plate is sensed at its optimum, so that a good indication of the temperature of the liquid crystalline material 2 is obtained. By integrating all functions, less space is occupied.

Figure 2:
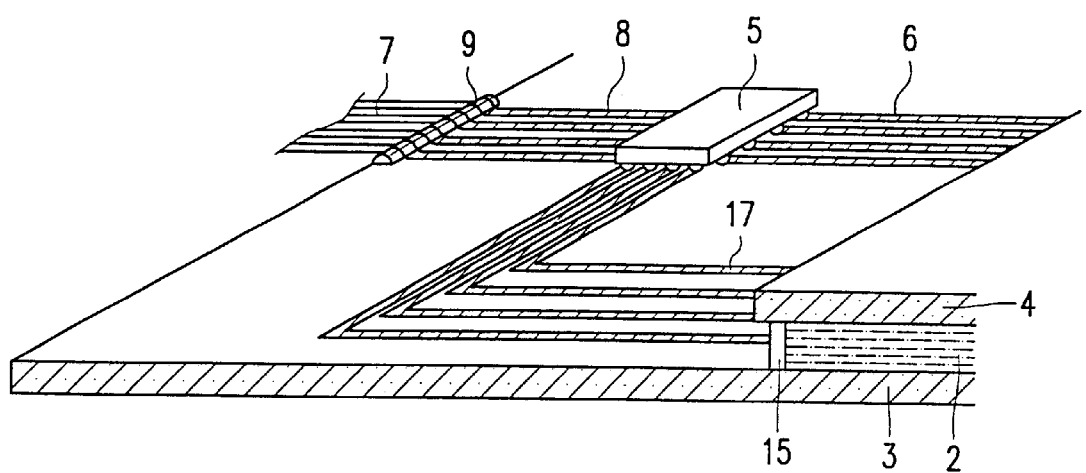
FIG. 2 shows a second embodiment of a device according to the invention.

FIG. 2 shows a further display device 1 with supporting plates 3, 4 enclosing an electro-optical medium 2, in this example a liquid crystalline material. The supporting plate 3 is provided with a display driver 5 for presenting display drive signals to column electrodes 6 and row electrodes. The row electrodes are placed on supporting plate 4 and connected to the electrode lines 17, such as by screen-printed contacts (not shown). For the sake of clarity, only a few column and row electrodes are shown in FIG. 1. The device has a sealing rim 15 between the supporting plates 3, 4, sealing the space in which the liquid crystal is kept.

Power supply lines, data and control lines 8 of the display driver 5 are connected through connector 9 to the corresponding-power supply, data and control lines of the remaining system (not shown). The remaining system includes the system controller that defines the data supplied to the display driver 5 through lines 7 and 8. In this embodiment the display driver 5 contains the temperature sensor capable of sensing the temperature of the liquid crystal. Also within display driver 5, the sensed temperature is converted into a digital value that can be read by the external system controller via lines 7 and 8.

The external system controller interprets the digital temperature value and determines the optimal (supply) voltage for driving the liquid crystal display. This value depends on the specific liquid crystal material 2 used. Via lines 7 and 8, the external system controller sends control data to the display driver 5, indicating the supply voltage for driving the liquid crystal display. This supply voltage is generated by a DC-DC converter included in the display driver 5.

Alternatively, if such DC-DC conversion is not available on the display driver 5, the supply voltage for driving the liquid crystal display is supplied via lines 7 and 8 to the display driver 5. In this case, the external controller will control an external supply voltage regulator (not shown) to provide the optimal supply voltage.

Although display devices having switching elements between row (or column) electrodes and picture electrodes (active displays) are not described in this Application, the invention is also applicable to these devices.

In summary, the invention provides a display device provided with a digital thermometer on-chip, sensing the temperature of the supporting plate of an electrooptical medium, for example, a liquid crystal display medium, while in a preferred embodiment, this digital temperature sensor is integrated with a column or row driver.

What is claimed is:

1. An electro-optical display device comprising:
   an electro-optical display medium between two supporting plates, a controller that is configured to provide a driver voltage that is dependent on an indication of temperature of the electro-optical display medium, to compensate for changes in said temperature, and
   a temperature sensor that
     provides a digitized temperature value as the indication of the temperature of the electro-optical display medium, and
     is arranged on one of the supporting plates.

2. An electro-optical display device as claimed in claim 1, wherein:
   the temperature sensor is located in an integrated circuit that is face-down bonded to said one of the supporting plates.

3. An electro-optical display device as claimed in claim 1, wherein
   the controller comprises at least one of: a microprocessor and a look-up table.

4. An electro-optical display device as claimed in claim 1, further including:
   a voltage driver, operably coupled to the controller, that:
     is configured to provide the driver voltage, and
     is arranged on the supporting plate on which the digital temperature sensor is arranged.

5. An electro-optical display device as claimed in claim 4, wherein
   at least one of the temperature sensor and the voltage driver is provided in an integrated circuit.

6. An electro-optical device as claimed in claim 4, wherein
   at least one of the temperature sensor and the voltage driver is realized by means of thin film technology.

7. An electro-optical display device as claimed in claim 1, wherein the controller is configured to provide a corrected supply voltage that provides the driver voltage.

8. An electro-optical display device as claimed in claim 1, wherein the controller is configured to generate a corrected drive voltage as the driver voltage.

* * * * *